(12) United States Patent
Wei et al.

(10) Patent No.: US 12,271,554 B2
(45) Date of Patent: Apr. 8, 2025

(54) TOUCH CIRCUIT, DRIVING METHOD, AND TOUCH DISPLAY PANEL

(71) Applicant: HKC CORPORATION LIMITED, Shenzhen (CN)

(72) Inventors: Dongmei Wei, Shenzhen (CN); Zhonglin Cao, Shenzhen (CN); Jie Chen, Shenzhen (CN); Yajuan Feng, Shenzhen (CN); Yao Li, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/629,988

(22) Filed: Apr. 9, 2024

(65) Prior Publication Data

US 2025/0004592 A1 Jan. 2, 2025

(30) Foreign Application Priority Data

Jun. 28, 2023 (CN) .......................... 202310782029.9

(51) Int. Cl.
*G06F 3/041* (2006.01)

(52) U.S. Cl.
CPC ...... *G06F 3/04166* (2019.05); *G06F 3/04164* (2019.05)

(58) Field of Classification Search
None
See application file for complete search history.

(56) References Cited

U.S. PATENT DOCUMENTS

| | | | | |
|---|---|---|---|---|
| 2016/0291784 | A1* | 10/2016 | Zhai | G06F 3/044 |
| 2017/0075487 | A1* | 3/2017 | Huang | G06F 3/0412 |
| 2023/0124102 | A1* | 4/2023 | Chen | G09G 3/20 |
| | | | | 345/212 |

FOREIGN PATENT DOCUMENTS

| | | |
|---|---|---|
| CN | 104951142 A | 9/2015 |
| CN | 107154218 A | 9/2017 |
| CN | 107358930 A | 11/2017 |
| CN | 108958549 A | 12/2018 |
| CN | 109887458 A | 6/2019 |
| CN | 113076028 A | 7/2021 |

(Continued)

OTHER PUBLICATIONS

Chinese First Office Action, Chinese Application No. 202310782029.9, mailed May 17, 2024 (14 pages).

(Continued)

*Primary Examiner* — Krishna P Neupane

(57) ABSTRACT

Disclosed are a touch circuit and driving method, and a touch display panel, the touch circuit includes a plurality of touch units, each touch unit includes a touch signal line, one or more data lines corresponding to the touch signal line, a data signal line connected to the data lines, transmitting a data signal to the data lines, a common signal line connected to the touch electrode; each touch unit includes a first transistor, a control terminal of the first transistor is connected to a first control signal line, a first conducting terminal is connected to the data lines or the data signal line, a second conducting terminal is connected to the touch signal line; though the aforesaid structure, reusing of the data signal line, reducing of the number of wires in the fanout wiring area, an effect of narrow bezel in the lower bezel can be realized.

19 Claims, 6 Drawing Sheets

(56) References Cited

FOREIGN PATENT DOCUMENTS

CN 115576444 A 1/2023
KR 20140136914 A 12/2014

OTHER PUBLICATIONS

Chinese Notification to Grant Patent Right for Invention, Chinese Application No. 202310782029.9, mailed Aug. 21, 2024 (5 pages).

* cited by examiner

TOUCH CIRCUIT, DRIVING METHOD, AND TOUCH DISPLAY PANEL

CROSS REFERENCE TO RELATED APPLICATIONS

The present application claims priority to Chinese Patent Application No. 202310782029.9, filed on Jun. 28, 2023, the entire contents of which are herein incorporated by reference in their entireties.

TECHNICAL FIELD

The present disclosure relates to the technical field of display panel, in particular to a touch circuit and driving method, and a touch display panel.

BACKGROUND

With the spread of Internet of Things, human-computer interaction is becoming more frequent, and the demand for screens which have capability to touch display is also increasing, In-cell touch technology (In-cell refers to the method of giving LCD screens the touch display capability of touch panels) is favored because of its advantages of realizing narrow bezels, integrated display and touch functions in IC (chip), reduced cost of the IC, reduced thickness of modules and mature technology.

Touch and Display Driver Integration (TDDI) technology is a common way of the In-cell touch technology, the TDDI technology is commonly based on self-capacitance touch, the common electrodes of the entire panel are divided into multiple touch blocks, each touch block is connected to a touch wire through a via hole, and connected to an IC touch channel through the touch wire. Each touch block corresponds to multiple pixel units and multiple data lines connected to the pixel units, the data signal is transmitted to the pixel units through the data lines during a display stage, and finally glows.

When the touch blocks are divided into M×N blocks, it is needed to pull M×N touch wires and S data lines, so the amount of fanout wires reaches an amount of M×N+S, the increasing of the amount of the wires in a wiring area inevitably increases the size of the lower bezel of the product.

SUMMARY

A first technical solution provided by some embodiments of the present disclosure is to provide a touch circuit, the touch circuit includes a plurality of touch units, each touch unit includes a touch signal line connected to a touch electrode through a via hole, one or more data lines corresponding to the touch signal line, a data signal line connected to the data lines, and a common signal line connected to the touch electrode; each of the touch units further has a first transistor arranged between the touch signal line and the data lines or the data signal line, a control terminal of the first transistor is configured to be connected to a first control signal line, a first conducting terminal is configured to be connected to the data lines or the data signal line, a second conducting terminal is configured to be connected to the touch signal line, for transmitting a touch signal to the touch electrode through the data lines or the data signal line during a touch stage; and a second transistor, a control terminal of the second transistor is configured to be connected to the second control signal line, a first conducting terminal thereof is configured to be connected to the common signal line, a second conducting terminal thereof is configured to be connected to the touch electrode or the touch signal line, for transmitting a common signal to the touch electrode or the touch signal line through the common signal line during a display stage.

A second technical solution provided by some embodiments of the present disclosure is to provide a driving method applied to the touch circuit, the driving method includes: in a display stage, the first control signal line is configured to control the first transistor to be cut-off, the second control signal line is configured to control the second transistor to conduct, the common signal line is configured to transmit a common signal to the touch electrode or the touch signal line through the second transistor; meanwhile, the data signal line is configured to transmit a display signal to the data lines; in a touch stage, the first control signal line is configured to control the first transistor to conduct, the data signal line is configured to transmit the touch signal to the touch signal line; the second control signal line is configured to control the second transistor to be cut-off.

A third technical solution provided by some embodiments of the present disclosure is to provide a touch display panel, the touch display panel includes a display area, a fanout wiring area and a circuit area arranged between the display area and the fanout wiring area, the circuit area has the touch circuit described in any embodiment of the first technical solution arranged therein.

BRIEF DESCRIPTION OF THE DRAWINGS

In order to more clearly illustrate technical solutions in embodiments of the disclosure, a brief description of the drawings required in the description of the embodiments will be given below. Obviously, the drawings described below are only some embodiments of the present disclosure, and other drawings can be obtained by those skilled in the art according to these drawings without any creative work.

Figure 1:
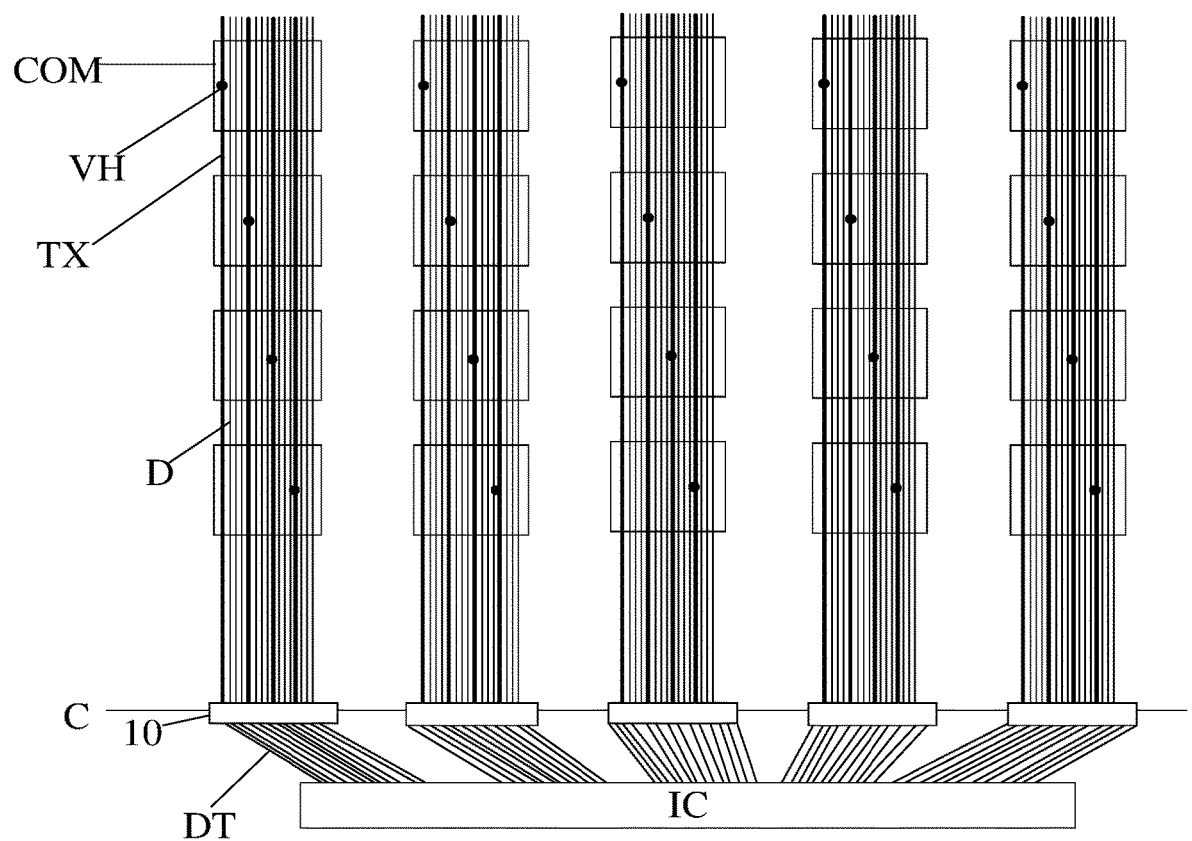
FIG. 1 is a schematic monolithic structural view of a touch circuit provided by some embodiments of the present disclosure.

Touch electrode, COM; touch signal line, TX; control chip, IC; touch unit, 10; first transistor, T1; second transistor, T2; third transistor, T3; first control signal line, S1; second control signal line, S2; third control signal line, S3; common signal line, C; data line, D; data signal line, DT; storage capacitor, SC; via hole, VH; pixel unit, PX.

DETAILED DESCRIPTIONS

The following will clearly and completely describe the technical solutions in the embodiments of the present disclosure in conjunction with the accompanying drawings in the embodiments of the present disclosure. Obviously, the described embodiments are only part of the embodiments of the present disclosure, not all of them. Based on the embodiments of the present disclosure, all other embodiments acquired by those skilled in the art without creative work shall fall within the scope of protection in the present disclosure.

In the following description, for purposes of illustration rather than limitation, specific details, such as specific system architectures, interfaces, and techniques, are set forth in order to provide a thorough understanding of the present disclosure. The terms "a" and "the" in the singular form used in embodiments of the present disclosure and in the accompanying claims are also intended to include the majority form, unless otherwise specifically defined, "a plurality of" generally includes at least two, but does not exclude the inclusion of at least one.

It should be understood that the term "and/or" used in this disclosure is merely an association relationship describing an associated object, indicating that there can be three kinds of relations, for example, A and/or B, can mean: A exists alone, A and B exist simultaneously, and B exists alone. In addition, the character "/" in this disclosure generally means that the associated object is an "or" relationship. The terms "first", "second", and "third" in the present disclosure are used for descriptive purposes only, and cannot be understood as indicating or implying relative importance or implicitly specifying the quantity of indicated technical features. Thus, features defined as "first", "second", and "third" may explicitly or implicitly include at least one of these features.

Furthermore, the terms "include", "have", and any variations thereof, are intended to cover a non-exclusive inclusion. For example, a process, method, system, product, or device including a series of operations or units is not limited to the listed operations or units, but optionally also includes unlisted operations or units, or optionally further includes other operations or units inherent in the process, method, product, or device.

All directional indications (such as up, down, left, right, front, back . . . ) in the embodiments of the present disclosure are only used to explain the relative positional relationships, movements, etc., of components in a certain posture (as shown in the figure), and if the specific posture is changed, the directional indications are also changed accordingly.

Reference to "embodiment" in the present disclosure means that, specific features, structures, or characteristics described in conjunction with the embodiments may be included in at least one embodiment of the present disclosure. The presence of the phrase at each location in the specification does not necessarily refer to the same embodiment, nor is it a separate or alternative embodiment that is mutually exclusive with other embodiments. It is understood, both explicitly and implicitly, by those skilled in the art that embodiments described herein may be combined with other embodiments.

Some embodiments of the present disclosure provide a touch circuit, referring to FIG. 1, FIG. 1 is a schematic monolithic structural view of a touch circuit provided by some embodiments of the present disclosure. As shown in FIG. 1, the touch circuit includes a plurality of touch electrodes COM arranged in an array and touch units 10. Each touch unit 10 includes a touch signal line TX connected to the touch electrodes COM through a via hole VH, one or more data lines D corresponding to the touch signal line TX, a data signal line DT connected to the data lines D, and a common signal line C connected to the touch electrodes COM which provides common signal for the touch electrodes COM. Specifically, when one touch electrode COM corresponds to a plurality of pixel units, each pixel unit may be connected to one data line, so that the touch signal line TX of a touch unit 10 is corresponding to a plurality of data lines D, the touch signal line TX and a plurality of data lines D are configured to control a light-emitting unit corresponding to the one touch electrode COM. When one touch electrode COM is corresponding to one pixel unit, the touch signal line TX may be arranged corresponding to one data line D, which is not limited here.

Figure 2:
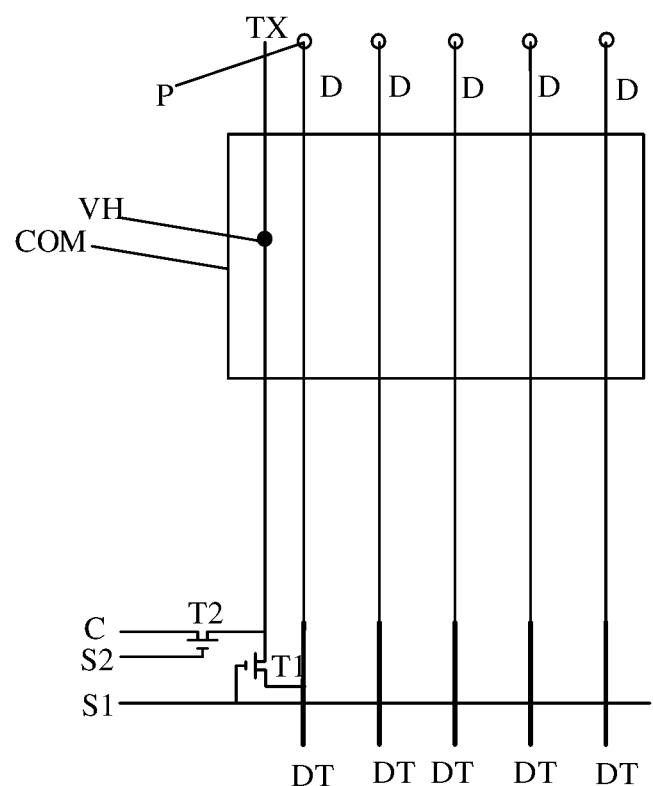
FIG. 2 is a schematic structural view of a touch unit provided by some embodiments of the present disclosure.

Each touch unit 10 may further include a first transistor T1 and a second transistor T2, referring to FIG. 2, FIG. 2 is a schematic structural view of a touch unit provided by some embodiments of the present disclosure.

In some embodiments, each touch unit 10 may further include the first transistor T1 arranged between the touch signal line TX and the data lines D or the data signal line DT. The first transistor T1 has a control terminal, a first conducting terminal, and a second conducting terminal. The control terminal of the first transistor T1 may be configured to be connected to the first control signal line S1, the first conducting terminal thereof may be configured to be connected to the data lines D or data signal line DT, and the second conducting terminal thereof may be configured to be connected to the touch signal line TX, the first transistor T1 is configured to transmit the touch signal to the touch electrodes COM through the data lines D or data signal line DT during a touch stage. In particular, the control terminal of the transistor may be a gate, the first conducting terminal may be one of a source and a drain, and the second conducting terminal may be the other of the source and the drain, which is not limited here.

The touch unit 10 may further include a second transistor T2, the control terminal of the second transistor T2 may be configured to be connected to the second control signal line S2, the first conducting terminal thereof may be configured to be connected to the common signal line C, and the second conducting terminal thereof may be configured to be connected to the touch electrodes COM or touch signal line TX, the second transistor T2 is configured to transmit the common signal to the touch electrodes COM or touch signal line TX through the common signal line C during a display stage.

Beneficial effect of some embodiments of the present disclosure: reusing the data signal line DT through the first transistor T1. The data signal line DT transmits the data signal to the data lines D during the display stage, meanwhile, the second transistor T2 controls the common signal line C to transmit a common voltage signal to the touch electrodes COM for normal display; the first transistor T1 controls it to be conducting between the touch signal line TX and the data lines D or the data signal line DT during the touch stage, and the second transistor T2 is configured to be cut-off to ensure the stability of the common voltage signal on the touch electrodes COM (to avoid the common voltage signal on the touch electrodes to discharge through the second transistor T2), meanwhile, the data signal line DT transmits the touch signal to the touch signal line TX, and transmits the touch signal to the touch electrodes COM through the touch signal line TX to detect the touch signal on the touch electrodes COM. In the touch stage, the data signal line DT may further transmit the touch signal to the data lines as the data signal of the touch stage. In the traditional touch circuit, the data lines and the touch signal line are routed separately, resulting in the number of wires in the lower bezel of the display panel being the sum of the data lines and the touch signal line; some embodiments of the present disclosure achieve the reusing of the data signal line through the transistor in the touch unit, and make the number of the data signal lines DT in the lower bezel of the display panel to be the same as the number of the data lines D in the display panel, thereby reduce the number of the touch signal lines TX.

It should be noted that the number of the control signal lines is much less than the number of touch signal lines, and the control signal of the control signal line is provided by the side bezel, which will not increase the number of lines in the lower bezel.

In some embodiments, the clock signal of the first control signal line S1 may be opposite to that of the second control signal line S2 so that the first transistor T1 and the second transistor T2 are not simultaneously conducting, that is, the first transistor T1 and the second transistor T2 do not simultaneously transmit signals to the touch electrodes.

In some embodiments, the clock signal of the first control signal line S1 and the second control signal line S2 are the same, that is, the first transistor is a transistor with a type opposite to that of the second transistor when the first control signal line S1 and the second control signal line S2 are the same control signal line. Specifically, one of the first transistor and the second transistor is a N-semiconductor-transistor and the other is a P-semiconductor-transistor. So as to reduce the number of the control signal lines, which is not limited here.

Figure 3:
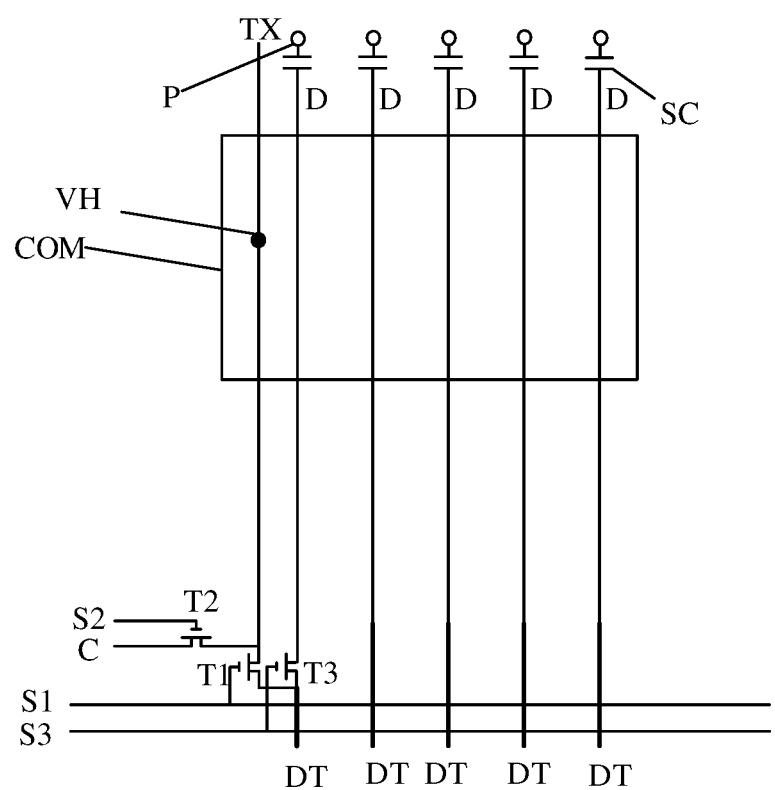
FIG. 3 is a schematic structural view of a touch unit provided by a second embodiment of the present disclosure.

Furthermore, the present disclosure provides a schematic structural view of a second embodiment of a touch unit. Referring to FIG. 3, FIG. 3 is a schematic structural view of a touch unit provided by a second embodiment of the present disclosure. As shown in FIG. 3, in addition to the first transistor T1 and the second transistor T2, the touch unit 10 may further include a third transistor T3, and the third transistor T3 is arranged between the data lines D and the data signal line DT. The control terminal of the third transistor T3 may be configured to be connected to the third control signal line S3, the first conducting terminal thereof may be configured to be connected to the data signal line DT, and the second conducting terminal thereof may be configured to be connected to the data lines D, the third transistor T3 may be configured to control the signal transmission between the data signal line DT and the data lines D. In some embodiments, the third transistor T3 may be configured to be conducting, and the data signal line DT transmits the data signal to the data lines D during the display stage; the third transistor T3 may be configured to be cut-off during the touch stage, and the data lines D maintain the data signal of the previous frame (display frame) to ensure the normal display of the display screen. In some embodiments of the present disclosure, each pixel unit P may further include a storage capacitor SC to store a data voltage to ensure the normal display of the pixel during the touch stage. In other words, in some embodiments, the data signal line DT transmits the touch signal of the current frame to the data lines D as a display signal, that is to say, a data signal of the pixel may invert following the touch signal, which will also make the pixel units P emit normally, the addition of the third transistor T3 may allow a greater flexibility in signal control.

Furthermore, the third transistor T3 may be arranged only between the data signal line DT and the data lines D connected to the first transistor T1, or between all of the data signal lines DT and the data lines D, which is not limited here.

In the second embodiment of the present disclosure, the data lines D and the touch signal line TX share one data signal line (wire) through the first transistor T1 and the third transistor T3, realizing the reusing of the data signal line, avoiding the touch signal line TX in a Fanout area (fanout pad area) to wiring separately, so as to reduce the size of the lower bezel.

In some embodiments, the third control signal line S3 and the second control signal line S2 are the same control signal line. The second transistor T2 and the third transistor T3 are simultaneously conducting or cut-off.

Furthermore, the clock signal of the third control signal line S3 may be opposite to that of the first control signal line S1, that is, when the first control signal line S1 outputs a high potential signal, the third control signal line S3 outputs a low potential signal, when the first control signal line S1 outputs a low potential signal, the third control signal line S3 outputs a high potential signal. In some embodiments, when the clock signal of the third control signal line S3 is the same as that of the first control signal line S1, that is, when the third control signal line S3 and the first control signal line S1 share one signal line, the third transistor T3 is a transistor with a type opposite to that of the first transistor T1, which is not limited here.

Figure 4:
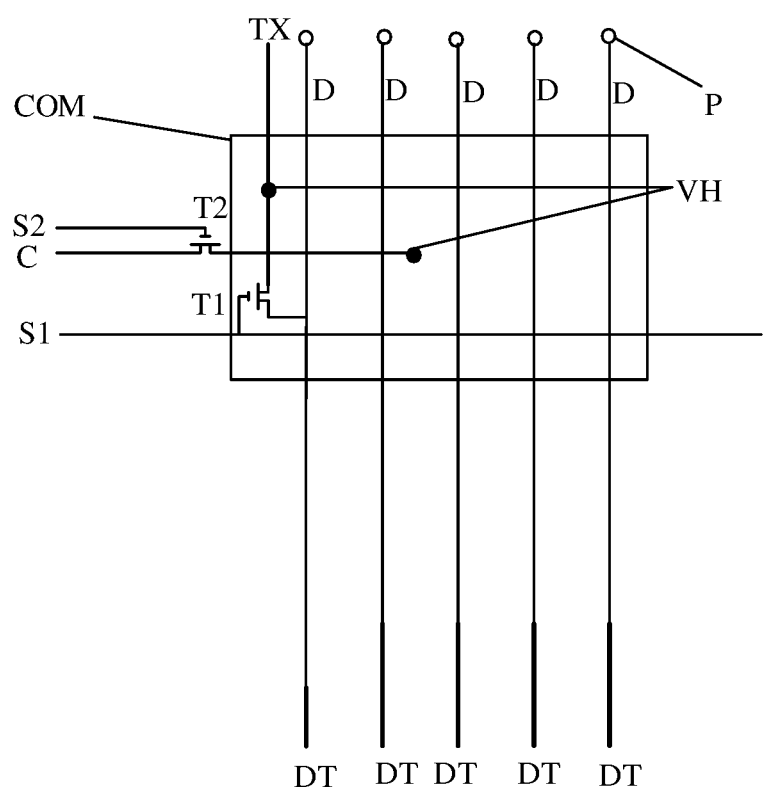
FIG. 4 is a schematic structural view of a touch unit provided by a third embodiment of the present disclosure.

In the aforesaid embodiments, the common signal line C may be configured to be connected to the touch electrodes COM through the touch signal line TX, that is, the common voltage signal is transmitted to the touch electrodes COM through the touch signal line TX during the display stage. In some embodiments, the common signal line C may transmit the common voltage signal directly to the touch electrodes COM through the second transistor T2 directly. Referring to FIG. 4, FIG. 4 is a schematic structural view of a touch unit provided by a third embodiment of the present disclosure. As shown in FIG. 4, the second conducting terminal of the second transistor T2 may be directly connected to the touch electrodes COM through the via hole VH, and the common signal for display which is transmitted from the common signal line C to the touch electrodes COM may be controlled through the second transistor T2 directly. In the third embodiment, the plurality of second transistors T2 may be arranged corresponding to one touch electrode COM to make the common signal on the touch electrodes COM be more well-distributed. Furthermore, one touch electrode COM corresponds to a plurality of array arranged pixel units P, each pixel unit P corresponds to one second transistor T2, so that the common signal may be evenly transmitted to the touch electrodes COM, reducing the display difference between the distal end and the near end, which is not limited here.

In the third embodiment, the first conducting terminal of the first transistor T1 may be connected to the data lines D extending to the touch electrodes COM at a position corresponding to the touch electrodes COM, thereby transmitting the touch signal through the data lines D, or may extend and be connected to the data signal line TD, which is not limited here.

Figure 5:
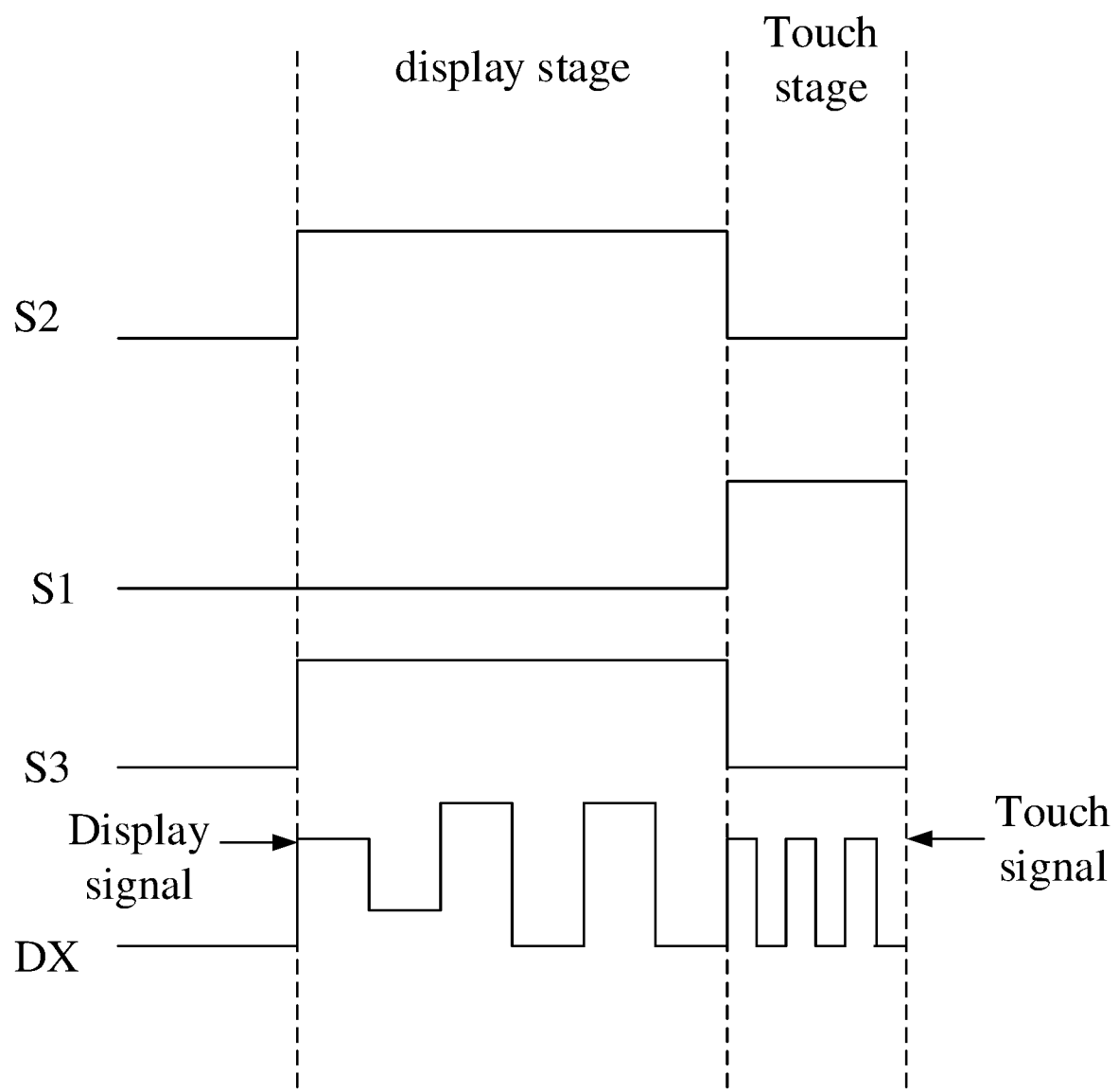
FIG. 5 is a schematic signal schedule chart of a touch circuit provided by some embodiments of the present disclosure.

Some embodiments of the present disclosure further provide a driving method applied to the touch circuit, referring to FIG. 5, FIG. 5 is a schematic signal schedule chart of a touch circuit provided by some embodiments of the present disclosure. As shown in FIG. 5, the sequential signal of the first control signal line S1 is opposite to that of the second control signal line S2 and the third control signal line S3, the data signal line TX may experience a display stage and a touch stage, in the display stage, the display signal is transmitted, the display signal gives a corresponding data signal based on each line, the data signal of each line may be different. In the touch stage, the touch signal may be transmitted.

The driving method includes the display stage and the touch stage. In the display stage, the first control signal line S1 may be configured to control the first transistor T1 to be cut-off, at which time the data signal line DT may be configured to transmit the display signal to the data lines D. Meanwhile, the second control signal line S2 may be configured to control the second transistor T2 to conduct, and the common signal line C may be configured to transmit the common signal to the touch electrodes COM or the touch signal line TX through the second transistor T2. In the touch stage, the first control signal line S1 may be configured to control the first transistor T1 to conduct, and the data signal line DT may be configured to transmit the touch signal to the touch signal line TX; meanwhile, the second control signal line S2 may be configured to control the second transistor T2 to be cut-off, thus maintaining the common voltage on the touch electrodes COM.

In some embodiments, in the display stage, the third control signal line S3 may be configured to control the third transistor T3 to conduct, and the data signal line DT may be configured to transmit the display signal to the data lines. In the touch stage, the third control signal line S3 may be configured to control the third transistor T3 to be cut-off, at which time the signals of the data lines D maintain the display signals of the display stage. It should be noted that in the touch stage, transmitting the touch signal or maintaining the display signals of the display stage in the data lines D will not affect the touch signal line TX of detecting the touch signal on the touch electrodes COM.

In the aforesaid embodiments, the data signal line DT is reused through the first transistor T1, the second transistor T2, and the third transistor T3, thereby reducing the number of wires and reducing the size of the lower bezel.

Figure 6:
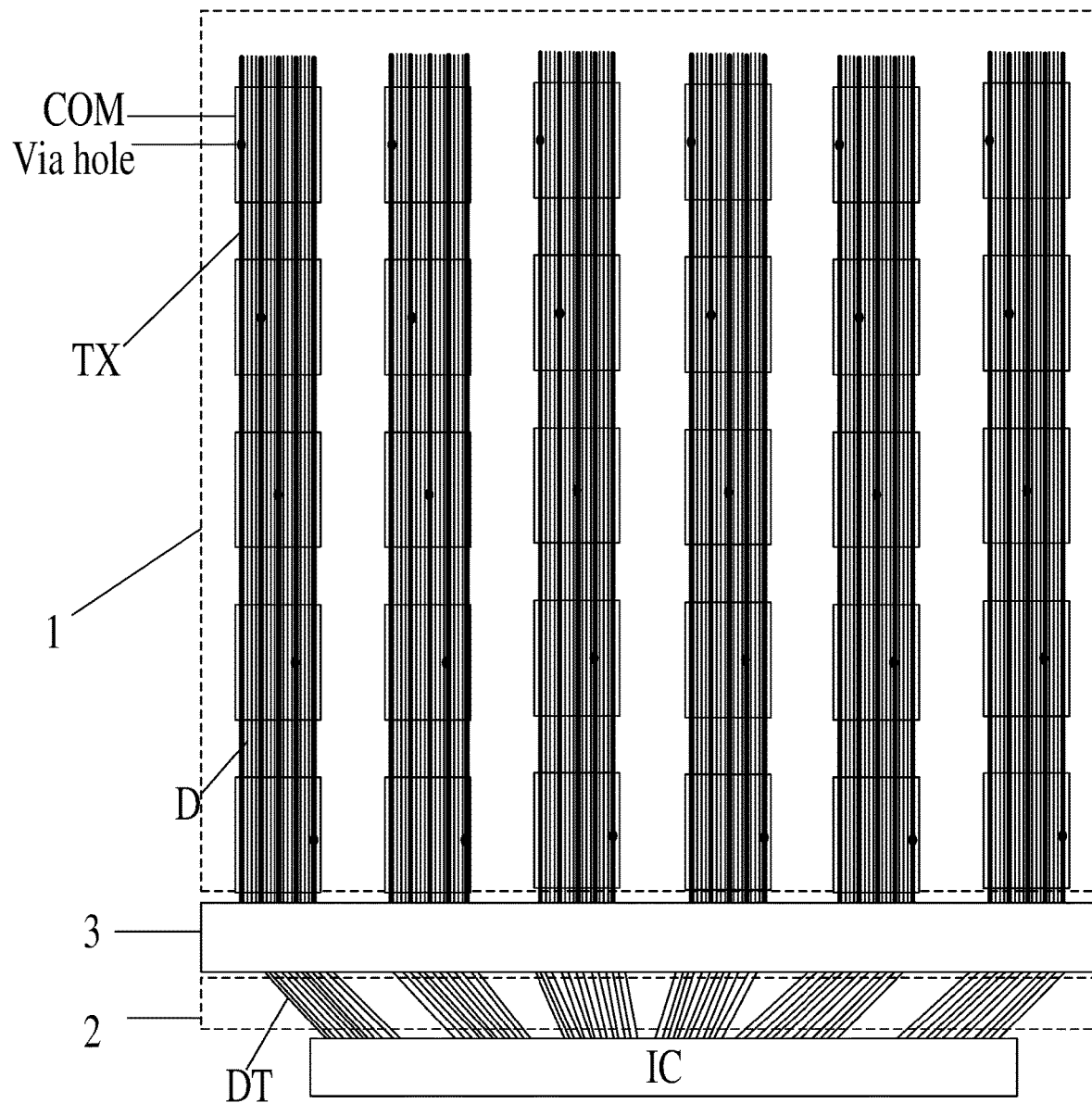
FIG. 6 is a schematic structural view of a touch display panel provided by some embodiments of the present disclosure.

Some embodiments of the present disclosure further provide a touch display panel, referring to FIG. 6, FIG. 6 is a schematic structural view of a touch display panel provided by some embodiments of the present disclosure. As shown in FIG. 6, the touch display panel may include a display area 1, a fanout wiring area 2 and a circuit area 3 arranged between the display area 1 and the fanout wiring area 2. The circuit area 3 has the touch circuit described in any embodiment of the first technical solution arranged therein.

The data signal line DT may be arranged in the fanout wiring area 2. Through the transistor in the circuit area 3, reducing the number of the data signal lines DT in the fan-out line area 2.

In some embodiments, the touch display panel may further include a control chip IC, the control chip IC may be arranged on a terminal of the data signal line DT away from the data lines D for transmitting the control signal. Specifically, the data signal may be transmitted in the display stage and the touch signal may be transmitted in the touch stage.

In some embodiments, the display area 1 of the touch display panel may include a plurality of partitioned touch electrodes COM, each touch electrode COM may be controlled by one touch unit 10.

In some embodiments, each touch electrode COM may correspond to one or more pixel units P, each pixel unit P may be connected to one data line D. Each touch electrode COM may be connected to one touch signal line TX. Therefore, one touch signal line TX may correspond to one or more data lines D. The touch signal line TX may be connected to one of the data lines D for receiving the touch signal transmitted by the data lines D during the touch stage.

In some embodiments, the touch circuit may be arranged in a non-display area corresponding to each touch electrode COM, which is not limited here.

Beneficial effect of the present disclosure: by setting the touch unit at the interface between the fanout wiring area 2 and the display area 1, the data signal line DT may be reused during touching, so as to reducing the number of wires in the fanout wiring area 2 and reducing the size of the lower bezel of products.

The above embodiments are only several embodiments of the present disclosure that have relatively specific and detailed description, and should not be understood as a limitation on the scope of the present disclosure. It should be noted that, for those skilled in the art, some modifications and improvements may be obtained without departing from the concept of the present disclosure, these modifications and improvements belong to the protection scope of the present disclosure. Therefore, the protection scope of the present disclosure shall be subject to the appended claims.

What is claimed is:

1. A touch circuit, wherein the touch circuit comprises a plurality of touch units, each touch unit comprises a touch signal line connected to a touch electrode through a via hole, one or more data lines corresponding to the touch signal line, a data signal line connected to the data lines, and a common signal line connected to the touch electrode;
    each of the touch units further comprises a first transistor having a control terminal, a first conducting terminal and a second conducting terminal, the control terminal of the first transistor is configured to be connected to a first control signal line, the first conducting terminal thereof is configured to be connected to the data lines or the data signal line, the second conducting terminal thereof is configured to be connected to the touch signal line, for transmitting a touch signal to the touch electrode through the data lines or the data signal line during a touch stage; and
    a second transistor having a control terminal, a first conducting terminal and a second conducting terminal, the control terminal of the second transistor is configured to be connected to a second control signal line, the first conducting terminal of the second transistor thereof is configured to be connected to the common signal line, the second conducting terminal thereof is configured to be connected to the touch electrode or the touch signal line, for transmitting a common signal to the touch electrode or the touch signal line through the common signal line during a display stage;
    wherein when one touch electrode corresponds to a plurality of pixel units, each pixel unit is connected to one data line, the touch signal line and a plurality of data lines are configured to control a light-emitting unit corresponding to the one touch electrode; when one touch electrode corresponds to one pixel unit, the touch signal line is arranged corresponding to one data line.

2. The touch circuit according to claim 1, wherein the touch circuit further comprises a third transistor arranged between the data lines and the data signal line, a control terminal of the third transistor is configured to be connected to a third control signal line, a first conducting terminal of the third transistor is configured to be connected to the data signal line, and a second conducting terminal of the third transistor is configured to be connected to the data lines.

3. The touch circuit according to claim 2, wherein a clock signal of the third control signal line is the same as that of the first control signal line, and the third transistor is a transistor with a type opposite to that of the first transistor.

4. The touch circuit according to claim 1, wherein a clock signal of the first control signal line is the same as that of the second control signal line, and the first transistor is a transistor with a type opposite to that of the second transistor.

5. The touch circuit according to claim 1, wherein each pixel unit further includes a storage capacitor to store a data voltage to ensure the normal display of the pixel during the touch stage.

6. The touch circuit according to claim 1, wherein the plurality of touch electrodes COM are arranged in an array.

7. The touch circuit according to claim 1, wherein a clock signal of the first control signal line is opposite to that of the second control signal line, the first transistor and the second transistor are not simultaneously conducting.

8. A driving method, applied to a touch circuit, and the touch circuit comprises a plurality of touch units, each touch unit comprises a touch signal line connected to a touch electrode through a via hole, one or more data lines corresponding to the touch signal line, a data signal line connected to the data lines, and a common signal line connected to the touch electrode; each of the touch units further comprises a first transistor having a control terminal, a first conducting terminal and a second conducting terminal, the control terminal of the first transistor is configured to be connected to a first control signal line, the first conducting terminal thereof is configured to be connected to the data lines or the data signal line, the second conducting terminal thereof is configured to be connected to the touch signal line, for transmitting a touch signal to the touch electrode through the data lines or the data signal line during a touch stage; and a second transistor having a control terminal, a first conducting terminal and a second conducting terminal, the control terminal of the second transistor is configured to be connected to a second control signal line, the first conducting terminal of the second transistor thereof is configured to be connected to the common signal line, the second conducting terminal thereof is configured to be connected to the touch electrode or the touch signal line, for transmitting a common signal to the touch electrode or the touch signal line through the common signal line during a display stage;
wherein the method comprises:
in a display stage, the first control signal line is configured to control the first transistor to be cut-off, the second control signal line is configured to control the second transistor to conduct, the common signal line is configured to transmit a common signal to the touch electrode or the touch signal line through the second transistor; meanwhile, the data signal line is configured to transmit a display signal to the data lines;
in a touch stage, the first control signal line is configured to control the first transistor to conduct, the data signal line is configured to transmit the touch signal to the touch signal line; the second control signal line is configured to control the second transistor to be cut-off;
wherein when one touch electrode corresponds to a plurality of pixel units, each pixel unit is connected to one data line, the touch signal line and a plurality of data lines are configured to control a light-emitting unit corresponding to the one touch electrode; when one touch electrode corresponds to one pixel unit, the touch signal line is arranged corresponding to one data line.

9. The method according to claim 8, wherein the touch circuit further comprises a third transistor arranged between the data lines and the data signal line, a control terminal of the third transistor is configured to be connected to a third control signal line, a first conducting terminal of the third transistor is configured to be connected to the data signal line, and a second conducting terminal of the third transistor is configured to be connected to the data lines.

10. The method according to claim 9, wherein a clock signal of the third control signal line is the same as that of the first control signal line, and the third transistor is a transistor with a type opposite to that of the first transistor.

11. The method according to claim 8, wherein a clock signal of the first control signal line is the same as that of the second control signal line, and the first transistor is a transistor with a type opposite to that of the second transistor.

12. The method according to claim 8, wherein the touch circuit further comprises the third transistor, the control terminal of the third transistor is configured to be connected to the third control signal line, the first conducting terminal thereof is configured to be connected to the data signal line, and the second conducting terminal thereof is configured to be connected to the data line; and the driving method further comprises:
in the display stage, the third control signal line is configured to control the third transistor to conduct, and the data signal line is configured to transmit the display signal to the data lines;
in the touch stage, the third control signal line is configured to control the third transistor to be cut-off, and the signal of the data lines is configured to maintain the display signal of the display stage.

13. A touch display panel, wherein the touch display panel comprises a display area, a fanout wiring area and a circuit area arranged between the display area and the fanout wiring area, the circuit area has a touch circuit arranged therein, and the touch circuit comprises a plurality of touch units, each touch unit comprises a touch signal line connected to a touch electrode through a via hole, one or more data lines corresponding to the touch signal line, a data signal line connected to the data lines, and a common signal line connected to the touch electrode;
each of the touch units further comprises a first transistor having a control terminal, a first conducting terminal and a second conducting terminal, the control terminal of the first transistor is configured to be connected to a first control signal line, the first conducting terminal thereof is configured to be connected to the data lines or the data signal line, the second conducting terminal thereof is configured to be connected to the touch signal line, for transmitting a touch signal to the touch electrode through the data lines or the data signal line during a touch stage; and
a second transistor having a control terminal, a first conducting terminal and a second conducting terminal, the control terminal of the second transistor is configured to be connected to a second control signal line, the first conducting terminal of the second transistor thereof is configured to be connected to the common signal line, the second conducting terminal thereof is configured to be connected to the touch electrode or the touch signal line, for transmitting a common signal to the touch electrode or the touch signal line through the common signal line during a display stage;
wherein when one touch electrode corresponds to a plurality of pixel units, each pixel unit is connected to one data line, the touch signal line and a plurality of data lines are configured to control a light-emitting unit corresponding to the one touch electrode; when one touch electrode corresponds to one pixel unit, the touch signal line is arranged corresponding to one data line.

14. The method according to claim 13, wherein the touch circuit further comprises a third transistor arranged between the data lines and the data signal line, a control terminal of the third transistor is configured to be connected to a third control signal line, a first conducting terminal of the third transistor is configured to be connected to the data signal line, and a second conducting terminal of the third transistor is configured to be connected to the data lines.

15. The method according to claim 14, wherein a clock signal of the third control signal line is the same as that of the first control signal line, and the third transistor is a transistor with a type opposite to that of the first transistor.

16. The method according to claim 13, wherein a clock signal of the first control signal line is the same as that of the second control signal line, and the first transistor is a transistor with a type opposite to that of the second transistor.

17. The touch display panel according to claim 13, wherein the data signal line is arranged in the fanout wiring area.

18. The touch display panel according to claim 13, wherein the touch display panel further comprises a control chip, the control chip is arranged on a terminal of the data signal line away from the data lines.

19. The touch display panel according to claim 13, wherein the display area of the touch display panel further comprises a plurality of partitioned touch electrodes, each touch electrode is controlled by one touch unit.

\* \* \* \* \*